United States Patent Office 3,269,903
Patented August 30, 1966

3,269,903
LIQUID PLASTIC DRESSING WHICH ABSORBS ULTRAVIOLET LIGHT
Bror Holger Fredrik Von Fieandt, Upplands-Vasby, and Bo Thuresson af Ekenstam, Bofors, Sweden, assignors to Aktiebolaget Bofors, Bofors, Sweden, a corporation of Sweden
No Drawing. Filed May 27, 1963, Ser. No. 283,598
Claims priority, application Sweden, Feb. 24, 1956, 1,776/56
16 Claims. (Cl. 167—58)

This application is a continuation in-part of our application, Serial No. 641,025, filed February 19, 1957, now abandoned.

This invention relates to liquid plastic dressings. More particularly, it is directed to liquid plastic dressings of marked permeability; and further characterized by their high absorptivity of ultra-violet light.

Liquid plastic dressings consist basically of a plastic, i.e., a resin, dissolved in a solvent. When such a solution is applied, as with a brush or by other suitable means, the solvent evaporates and a film remains. Where the sites of application is a part of the human body, the film produced should be elastic, non-irritating and porous.

Such elasticity has been obtained in the past by the inclusion of plasticizers in the liquid dressing.

However, the plastic dressings heretofore known were characterized by marked disadvantages. The films, as initially developed, were soft and elastic despite the fact that the resinous component was brittle. The elasticity was achieved by the inclusion of plasticizers. However, such elasticity was temporary since the plasticizers employed were volatile. As a consequence thereof, the elastic characteristics of the film disappeared and the films became brittle. Furthermore, the plastic films irritated the skin because the plasticizers were not only irritating, but also because the presence of the plasticizer prevented diffusion of vapor.

In the investigations which led to the present invention, it was found that a film developed from a solution of polymeric-2-ethoxyethyl-methacrylate or polymeric-2-methoxyethyl-methacrylate in a volatile solvent was characterized by outstanding permeability and requisite elasticity.

A comparison was made of the characteristics of films developed from the above mentioned polymeric-2-ethoxyethyl - methacrylate or polymeric - 2 - methoxyethyl-methacrylate and films developed from other resinous substances. In these tests, the diffusion characteristics, i.e., permeability in milligrams per square centimeter through a film having a thickness of 0.1 mm. during a period of 24 hours were carried out as follows:

The films were prepared in the following manner: 40 parts of monomer, 60 parts of ethyl acetate and 0.2–0.6 part of benzoyl peroxide were heated in a glass retort or a water bath, the retort being provided with a stirrer and a reflux condenser. Polymerization was effected by maintaining a temperature of approximately 75° C. for about 24 hours.

The polymers produced were made up into solutions (using ethyl acetate as the solvent) having a resin content of 15%. The solutions were filmed out to a thickness of 0.1 mm. The films obtained were then applied to a Payne cup containing distilled water. The cup containing the distilled water was then carefully weighed twice a day during a period of 24 hours. After approximately 24 hours, the measured values remained constant, i.e., the evaporation of water per diem is constant.

The last mentioned constant values are set forth in the following table:

| The film: | Diffusion through film 0.1 mm. thickness, in mg./sq. cm. during 24 hours |
|---|---|
| Polymeric-2-ethoxyethyl-methacrylate | 65 |
| Polymeric-2-methoxyethyl-methacrylate | 49 |
| Polyvinylbutyral | 4.6 |
| Polymethyl-methacrylate | 11 |
| Polybutyl-methacrylate | 13 |
| Polyisobutyl-methacrylate | 4.8 |
| Polyisoamyl-methacrylate | 3.4 |
| Polyethyl-methacrylate | 11 |
| Polymethylacrylate | 28 |

The polymeric-2-ethoxyethyl-methacrylate allows for the diffusion of 65 mg. of vapor per square centimeter through a film having a thickness of 0.1 mm. during a period of 24 hours. A like film of polymeric-2-methoxyethyl-methacrylate allows for the diffusion of 49 mg. Such permeability is in marked contrast to the meager permeabilities of the other resinous films.

In the practice of dermatology, there are used substances which are extremely sensitive to ultra-violet light. The ultra-violet light causes those substances to decompose; and, as a consequence, injuries to the skin may follow. Moreover, the substances are rather sticky or tacky and tend to smear. Generally, to prevent the occurrence of such disadvantages, it is the practice to cover the substances, after application, with an appropriate bandage, as for example, that of gauze or the like. However, dressings of that character are difficult to handle. A marked advantage of the instant invention is that it provides for the inclusion of the above mentioned dermatologically active substances.

Accordingly, it is among the principal objects of this invention to provide a liquid plastic dressing which overcomes the disadvantages of dressings heretofore known being characterized by the feature that the films developed from the instant dressings are flexible, possess high permeability, and also absorb ultra-violet light; and further characterized by the absence of a plasticizer.

For dermatological purposes, this invention allows for the application of a dermatologically active substance, followed by the application of a solution of the resins in accordance with the instant invention. Instead of the two step application just mentioned, a single step application can be carried out by including the dermatologically active substance in the solution of the resin. Thus, a solution containing both the resin and a dermatologically active substance can be applied with a brush or other suitable means, or sprayed on at the sites to be covered.

The following are examples in accordance with this invention:

*Example 1*

40 parts of 2-ethoxyethyl-methacrylate in 60 parts of ethyl acetate and 1 part of benzoyl peroxide were heated for 24 hours, under reflux. The resultant solution of the polymeric-2-ethoxyethyl-methacrylate was applied over the area of the skin to which a tar preparation (albapyrrole/pure coal tar) had been applied. A protective dressing was thus formed which prevented clothing from being soiled by the tar and also prevented the major portion of ultra-violet rays from reaching the tar preparation and causing decomposition thereof.

A film, 0.1 mm. thick, of polymeric-2-ethoxyethyl-methacrylate has a light transmission of less than 20% for wave lengths up to 2800 A. and 50% in the range of 2800 to 2900 A.

*Example 2*

To a solution of polymeric-2-ethoxyethyl-methacrylate prepared as described in Example 1, 0.2 parts of tetramethyl thiuram disulfide was added which, in addition to its disinfecting effect, also increases the ability of the resin to absorb ultra-violet light.

A film, 0.1 mm. thick, of the product of this example, has a light transmission of less than 10% at wave lengths up to 3000 A. and less than 50% in the range of 3000 to 3300 A.

The liquid dressing of this example can be applied over a tar preparation to develop a film, in the same way as described in Example 1.

*Example 3*

To 100 parts of the solution produced as described in Example 2, there were added 7 parts of albapyrrole and 10 parts of ethyl acetate.

When the product of this example is brushed on, there is developed a non-tacky film which does not produce injury to the skin under ultra-violet radiation.

*Example 4*

To 100 parts of a solution prepared in accordance with Examples 1 or 2, there were added 7 parts of albapyrrole and 150 parts of ethyl acetate.

The product was filtered to remove insolubles. The obtained solution was then put up in aerosol containers, with a suitable fluoro-chloro-hydrocarbon as a propellant, in accordance with known procedures.

After spraying on the situs of application, a non-tacky film was developed having the desired properties mentioned above.

*Example 5*

A solution similar to those described in foregoing examples is prepared, except that 0.4 part of benzocaine is substituted for the tetramethylthiuram disulfide which also provides for an increase in the ultra-violet light absorption by the developed film. The similarity in ultra-violet light absorption is attributable to the light absorbing characteristics of benzocaine.

*Example 6*

40 parts of 2-methoxyethyl-methacrylate in 60 parts of ethyl acetate and 1 part of benzoyl peroxide were heated for 24 hours, under reflux. The resultant solution of the polymeric-2-methoxyethyl-methacrylate was applied over the area of the skin to which a tar preparation (albapyrrole/pure coal tar) had been applied. A protective dressing was thus formed which prevented clothing from being soiled by the tar and also prevented the major portion of ultra-violet rays from reaching the tar preparation and causing decomposition thereof.

A film of 0.1 mm. polymeric-2-methoxyethyl-methacrylate has a light transmission of less than 5% for wave lengths up to 2500 A. and 25% up to 2750 A.

From the foregoing, it will be observed that the liquid plastic dressing, in its fundamental aspects, consists of polymeric-2-ethoxy-ethyl-methacrylate or polymeric-2-methoxyethyl-methacrylate dissolved in a readily volatile non-irritating solvent, exemplified particularly by ethyl acetate. Solvents other than ethyl acetate may be used as the solvent, provided that they are not irritating to the skin, and also devoid of any other objectionable characteristics, such other solvents being acetone, 1,1,2-trifluoro-1,2,2-trichloroethane (trade name Freon 113), n-propylalcohol, isopropyl alcohol and mixtures of ethyl alcohol and petroleum ether.

When the liquid plastic dressings in accordance with this invention are applied as by brushing or the like, the resin content thereof, on a gravimetric basis, is present in an amount of 7–50% of the composition, preferably 15–35%; and when applied by spraying, the resin content of the sprayable composition is present, on a gravimetric basis, in an amount of 1.5–7%, preferably 2.5–5%.

It will be understood that the foregoing description of the invention and the examples set forth are merely illustrative of the principles thereof. Accordingly, the appended claims are to be construed as defining the invention within the full spirit and scope thereof.

We claim:

1. A liquid plastic dressing for application to the skin by brushing consisting essentially of polymeric-2-ethoxyethyl-methacrylate and polymeric-2-methoxyethyl-methacrylate dissolved in ethyl acetate, the polymers constituting, by weight of the dressing, from 7 to 50%.

2. A liquid plastic dresisng in accordance with claim 1 wherein the polymer constitutes, by weight of the dressing, from 15 to 35%.

3. A liquid plastic dressing for application to the skin by spraying consisting essentially of polymeric-2-ethoxyethylmethacrylate dissolved in ethyl acetate, the polymer constituting, by weight of the dressing, from 1.5 to 7%.

4. A liquid plastic dressing in accordance with claim 3 wherein the polymer constitutes, by weight of the dressing, from 2.5 to 5%.

5. A liquid plastic dressing consisting essentially of an effective amount of a member of the group consisting of polymeric-2-ethoxyethyl-methacrylate and polymeric-2-methoxyethyl-methacrylate and an effective amount of a therapeutically active substance dissolved in ethyl acetate.

6. A liquid plastic dressing in accordance with claim 5 wherein the polymer is polymeric-2-ethoxyethyl-methacrylate.

7. A liquid plastic dressing in accordance with claim 6 wherein the polymer is polymeric-2-methoxyethyl-methacrylate.

8. A liquid plastic dressing consisting essentially of an effective amount of a member of the group consisting of polymeric-2-ethoxyethyl-methacrylate and polymeric-2-methoxyethyl-methacrylate and an effective amount of pure coal tar dissolved in ethyl acetate.

9. A liquid plastic dressing consisting essentially of an effective amount of a member of the group consisting of polymeric-2-ethoxyethyl-methacrylate and polymeric-2-methoxyethyl-methacrylate and an effective amount of tetramethylthiuramdisulfide dissolved in ethyl acetate.

10. A liquid plastic dressing consisting essentially of an effective amount of a member of the group consisting of polymeric-2-ethoxy-ethyl-methacrylate and polymeric-2-methoxyethyl-methacrylate and an effective amount of benzocaine dissolved in ethyl acetate.

11. The method of covering the skin with a permeable, flexible film which comprises applying thereto a solution of an effective amount of a member of the group consisting of polymeric-2-ethoxyethyl-methacrylate and polymeric-2-methoxyethyl-methacrylate dissolved in ethyl acetate.

12. Method of coverign the skin with a permeable, flexible film which comprises applying thereto an aerosol containing as the essential film forming substance an effective amount of a member of the group consisting of polymeric-2-ethoxyethyl-methacrylate and polymeric-2-methoxyethyl-methacrylate.

13. Method of covering the skin to which a dermatologically active substance has been applied which comprises aplying over said substance a solution containing an effective amount of a member of the group consisting of polymeric-2-ethoxyethyl-methacrylate and polymeric-2-methoxyethyl-methacrylate dissolved in acetone.

14. A liquid plastic dressing for application to the skin by brushing consisting essentially of polymeric-2-ethoxyethyl-methacrylate dissolved in ethyl acetate, the polymer constituting, by weight of the dressing, from 7 to 50%.

15. Method in accordance with claim 12 wherein the film forming substance is polymeric-2-ethoxyethyl-methacrylate.

16. Method in accordance with claim 13 wherein the member is polymeric-2-ethoxyethyl-methacrylate.

References Cited by the Examiner

UNITED STATES PATENTS

| | | | |
|---|---|---|---|
| 2,268,611 | 1/1942 | Mitchell | 260—89.5 |
| 2,406,454 | 8/1946 | Charlton | 260—89.5 |
| 2,542,897 | 2/1951 | Brown et al. | 167—58 |
| 2,568,760 | 9/1951 | Pearl | 167—90 |
| 2,568,894 | 9/1951 | Mackey | 167—90 |

OTHER REFERENCES

Chemical Abstracts, vol. 42, 7247–7248 (1948).
Chemical Abstracts, vol. 46, 6904f (1952).
Chemical Abstracts, vol. 47, 4132h (1953).
Merck Index, 6 ed., Merck and Co., Rahway, N.J. (1952), pp. 146, 255 and 407.

JULIAN S. LEVITT, *Primary Examiner.*

VERA C. CLARKE, *Assistant Examiner.*